United States Patent
Meid et al.

(10) Patent No.: US 10,684,182 B2
(45) Date of Patent: *Jun. 16, 2020

(54) METHOD FOR DETERMINING A MASS OF AN ATTACHED IMPLEMENT FOR A UTILITY VEHICLE

(71) Applicant: Deere & Company, Moline, IL (US)

(72) Inventors: Michael Meid, Waghaeusel (DE); Sebastian Traut, Kaiserslautern (DE)

(73) Assignee: Deere & Company, Moline, IL (US)

( * ) Notice: Subject to any disclaimer, the term of this patent is extended or adjusted under 35 U.S.C. 154(b) by 588 days.

This patent is subject to a terminal disclaimer.

(21) Appl. No.: 15/463,039

(22) Filed: Mar. 20, 2017

(65) Prior Publication Data

US 2017/0315006 A1 Nov. 2, 2017

(30) Foreign Application Priority Data

Apr. 27, 2016 (DE) .................. 10 2016 207 200

(51) Int. Cl.
*G01L 5/00* (2006.01)
*A01B 59/06* (2006.01)
(Continued)

(52) U.S. Cl.
CPC .......... *G01L 5/0095* (2013.01); *A01B 59/069* (2013.01); *A01B 63/10* (2013.01);
(Continued)

(58) Field of Classification Search
None
See application file for complete search history.

(56) References Cited

U.S. PATENT DOCUMENTS 4,627,013 A * 12/1986 Ichiyama ................ E02F 9/264
177/141
5,824,965 A * 10/1998 Fujii ...................... G01G 19/12
177/136
(Continued)

FOREIGN PATENT DOCUMENTS

DE 3820757 A1 12/1989
DE 4328147 A1 2/1995
(Continued)

OTHER PUBLICATIONS

European Search Report issued in counterpart application No. 17165883.4 dated Oct. 5, 2017. (8 pages).
(Continued)

*Primary Examiner* — Christian Chace
*Assistant Examiner* — Michael F Whalen

(57) ABSTRACT

A method for determining a mass of an implement includes providing a rear powerlift having at least one upper link and at least one lower link and a support structure disposed at the rear of a utility vehicle. The method includes defining an angle ($\psi$) between the upper link and a vehicle horizontal line, an angle ($\varphi$) between the lower link and the vehicle horizontal line, an angle of inclination ($\theta$) of a vehicle horizontal line relative to a terrestrial horizontal line, a path (LV) representative of a connection along the lower link between the support structure and the implement, and a force ($F_U$) impinging on a connection between the upper link and the implement and acting along the upper link. The mass is determined by at least one of the angle ($\psi$), the angle ($\varphi$), the angle of inclination ($\theta$), the path (LV), and the force ($F_U$).

11 Claims, 4 Drawing Sheets

(51) Int. Cl.
*A01B 63/10* (2006.01)
*A01B 63/102* (2006.01)
*A01B 63/11* (2006.01)
*A01B 63/14* (2006.01)

(52) U.S. Cl.
CPC .......... *A01B 63/102* (2013.01); *A01B 63/11* (2013.01); *A01B 63/145* (2013.01)

(56) References Cited

U.S. PATENT DOCUMENTS

| | | | | |
|---|---|---|---|---|
| 5,929,389 | A * | 7/1999 | Keuper | G01G 19/083 177/141 |
| 6,119,786 | A * | 9/2000 | Creger | A01B 63/1115 172/7 |
| 6,518,519 | B1 * | 2/2003 | Crane, III | E02F 9/264 177/136 |
| 8,909,437 | B2 * | 12/2014 | Zhu | E02F 3/435 701/124 |
| 2005/0000703 | A1 * | 1/2005 | Furuno | G01G 19/08 172/2 |
| 2008/0110647 | A1 | 5/2008 | Guo et al. | |
| 2009/0143896 | A1 * | 6/2009 | Janardhan | B25J 9/1638 700/213 |
| 2014/0019015 | A1 * | 1/2014 | Claxton | E02F 9/00 701/50 |
| 2014/0121840 | A1 * | 5/2014 | Mizuochi | E02F 9/265 700/275 |
| 2018/0211450 | A1 * | 7/2018 | Gresch | G07C 5/008 |

FOREIGN PATENT DOCUMENTS

| | | |
|---|---|---|
| DE | 69409155 T2 | 7/1998 |
| DE | 102012216306 A1 | 3/2014 |
| EP | 0892256 A1 | 1/1999 |
| EP | 2947431 A1 | 11/2015 |
| WO | WO-2008140336 A1 * | 11/2008 ........... G01G 19/083 |

OTHER PUBLICATIONS

German Search report in foreign counterpart application No. 102016207200.5 dated Aug. 23, 2016 (8 pages).

\* cited by examiner

METHOD FOR DETERMINING A MASS OF AN ATTACHED IMPLEMENT FOR A UTILITY VEHICLE

RELATED APPLICATIONS

This application claims the benefit of German Application Ser. No. 102016207200.5, filed on Apr. 27, 2016, the disclosure of which is hereby expressly incorporated by reference in its entirety.

FIELD OF THE DISCLOSURE

The present disclosure relates to a method for determining a mass of an attached implement that is articulated to a support structure of a utility vehicle.

BACKGROUND

Coupling attached implements with defined working functions to the rear end of agricultural vehicles is known in the art. A rear powerlift, for example, can be used for the coupling. It is often important to obtain information about the current status of a mass of the attached implement during vehicle operation in order to be able to control the agricultural activity better.

There is a need for a process of determining current status information regarding a mass of the attached implement.

SUMMARY

In one embodiment of the present disclosure, respective status information regarding a determined mass is particularly relevant for attached implements having variable load materials (e.g. agents to be sprayed, fertilizer, seed) such as sprayers, fertilizer spreaders and seeders.

The determined mass of the attached implement is a current total mass of the attached implement including the current loaded material, or a mass of the attached implement without a load material. Since the mass of the attached implement can be determined or is already known, the amount of the loaded material that has been consumed can be determined at any time during the deployment of the vehicle. From the determination of the attached implement mass, additional information can also be derived such as the dispensed mass or quantity of the loaded material per traveled distance unit (e.g. meter) of the vehicle, or a residual range of the loaded material to be dispensed. Such information can be derived with little data or calculation effort and can be made available to the vehicle driver or some other person responsible for the vehicle deployment in a suitable manner visually and/or acoustically (e.g., on a graphical user interface). Determining the mass and the information derived therefrom can therefore contribute to making the respective work deployment of the vehicle efficient and comfortable for the vehicle driver.

The mass of the attached implement is determined based on physical parameters at the rear powerlift that can be determined relatively easily. At least one of the following parameters determined includes:

- an angle between the upper link and a vehicle horizontal line,
- an angle between the lower link and a vehicle horizontal line,
- an angle of inclination of a vehicle horizontal line relative to the terrestrial horizontal line,
- a path that represents a connection along the lower link between the support structure and the attached implement, or
- a force impinging on a connection between the upper link and the attached implement and acting along the upper link.

The above-mentioned angles can be determined by means of suitable length sensors or distance sensors. Alternatively, angle sensors can be used. For a mechanical upper link or lower link, the angle between the upper link or lower link and a vehicle horizontal line can also be determined by means of a biaxial force sensor (force measuring pin). The above-mentioned path is known and need not be further determined. Alternatively, a length sensor or distance sensor can be used to determine the path. The force impinging on the connection between the upper link and the attached implement and acting along the upper link can be determined by means of pressure sensors in the upper link. For a mechanical upper link, this force can also be determined by means of a biaxial force sensor (force sensing pin). This biaxial force sensor is arranged at a connecting point that acts as the connection between the support structure and the upper link.

The additional angles, paths and forces yet to be described can also be determined or measured by one or more of the above-mentioned sensors.

Overall, the mass of the attached implement can be determined with a small number of sensors available as standard products and therefore cost-effectively, and with a low number of sensed physical parameters. Some of the required sensors may already be present on the vehicle for other purposes, so that the expense for determining the mass of the attached implement is further reduced in such cases.

The angles formed relative to the vehicle horizontal line or the vehicle vertical line relate to a fixed vehicle coordinate system. The inclination of the support structure or the utility vehicle or the fixed vehicle coordinate system relative to the terrestrial horizontal line is taken into account here by the above-mentioned angle of inclination. The angle of inclination takes on values greater than zero when the utility vehicle is oriented uphill in the forward direction.

In particular, the utility vehicle is an agricultural vehicle such as a tractor. The support structure is a support structure of the vehicle, e.g., a frame or other supporting parts. The upper link and the lower links of the rear powerlift are pivotably mounted on or articulated to the support structure in order to be able to transfer the respective attached implement into different positions.

The pivotable mounting or articulation on the support structure means that the respective component is either mounted or articulated directly on the support structure itself or on a component rigidly connected to the support structure (e.g. the casing of a transmission differential block).

The powerlift typically affects a multipoint mounting of the attached implement on the vehicle. In particular, a three point hitch is provided with which the attached implement is hitched or articulated to the support structure by means of two lower links and one upper link.

The powerlift usually contains at least one adjustable-length lifting arm in order to be able to transfer the attached implement into different positions (e.g., working position, transport position) by means of the existing lower links and upper link. The lift arms present on the powerlift are actuated at least in part in a manner (e.g., hydraulically or electrically) suitable for implementing lifting and lowering movements of the powerlift.

An adjustable-length lifting arm is advantageously used to derive one or more physical parameters for determining the mass of the attached implement. This takes into account an angle that is enclosed by a vehicle vertical line and a connecting path between two operative ends of the lifting arm. This angle is determined by means of a suitable sensor system, e.g., an angle sensor.

A pressure force acting between the two operative ends of the lifting arm is further considered for determining the mass of the attached implement. This force can be determined either directly by means of a sensor system on this lifting arm or indirectly by means of a sensor system at some other suitable point of the powerlift. The sensor system includes a pressure sensor, more particularly a differential pressure sensor.

One operative end of the adjustable-length lifting arm has an articulated connection to the support structure, while an additional operative end of the lifting arm is articulated to a link-connecting point of the lower link. An additional parameter for determining the mass of the attached implement can advantageously be considered in this way. This parameter is the length of a connecting path along the lower link between the support structure and the link-connecting point. The length of this connecting path is either already known from the data for the powerlift or is determined in a suitable manner.

As already mentioned above, an operative end of the adjustable-length lifting arm has an articulated connection to the support structure. This connection is implemented as an indirect articulated connection in which said operative end of the lifting arm is first articulated to an additional joint arm, which in turn has an articulated connection to the support structure.

The joint arm has at least three articulation points. In this way it is possible in a kinematically simple manner to connect an additional adjustable-length lifting arm to the third articulation point and the support structure. This additional lifting arm can then be driven (e.g. hydraulically) in order to effect a length adjustment of the lifting arm between the joint arm and the lower link.

Individual or all adjustable-length lifting arms used in the powerlift are each constructed as a piston-cylinder unit and act in particular as hydraulic lifting cylinders, which can be coupled to a hydraulic control circuit in a technically simple manner.

In another embodiment, individual adjustable-length lift arms are each constructed as a spindle-thread unit (lifting spindle). The length thereof can be adjusted, e.g. by means of an additional lifting arm inside the powerlift. This additional lifting arm is constructed in particular as a hydraulically controllable lifting cylinder.

The determined mass of the attached implement is advantageously also used to determine data regarding the center of gravity of the attached implement. This can support a movement control of the rear powerlift, e.g., for a precise transfer of the attached implement into a desired target position.

A coordinate system having an x-axis and a z-axis is defined for unambiguous determination of the center of gravity. The x-axis is oriented parallel to a longitudinal direction or a vehicle horizontal line of the utility vehicle and the z-axis is oriented parallel to a vertical direction or a vehicle vertical line of the vehicle, the x-axis and the z-axis intersecting in a zero point of the coordinate system. Thereby the data for the center of gravity can be easily determined mathematically with an unambiguous reference point. Suitable zero points can be the position of a rear axle of the vehicle, for example.

In a further embodiment, the determined data for the center of gravity of the attached implement contains the x-coordinate thereof in the above-mentioned coordinate system, whereby sufficient data for a movement control of the rear powerlift and for determination of the current position of the attachment can be determined in many application cases with a small algorithmic processing effort.

The x-coordinate of the center of gravity of the attached implement is determined as a function of at least one of the following physical parameters at the rear powerlift:
- an angle between the upper link and a horizontal line of the vehicle,
- a force impinging on a connection between the upper link and the attached implement and acting along the upper link,
- an x-coordinate of an articulation point of the lower link on the attached implement,
- a difference between the x-coordinates of an articulation point of the upper link on the attached implement and an articulation point of the lower link on the attached implement, and
- a difference between the z-coordinates of an articulation point of the upper link on the attached implement and an articulation point of the lower link on the attached implement.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
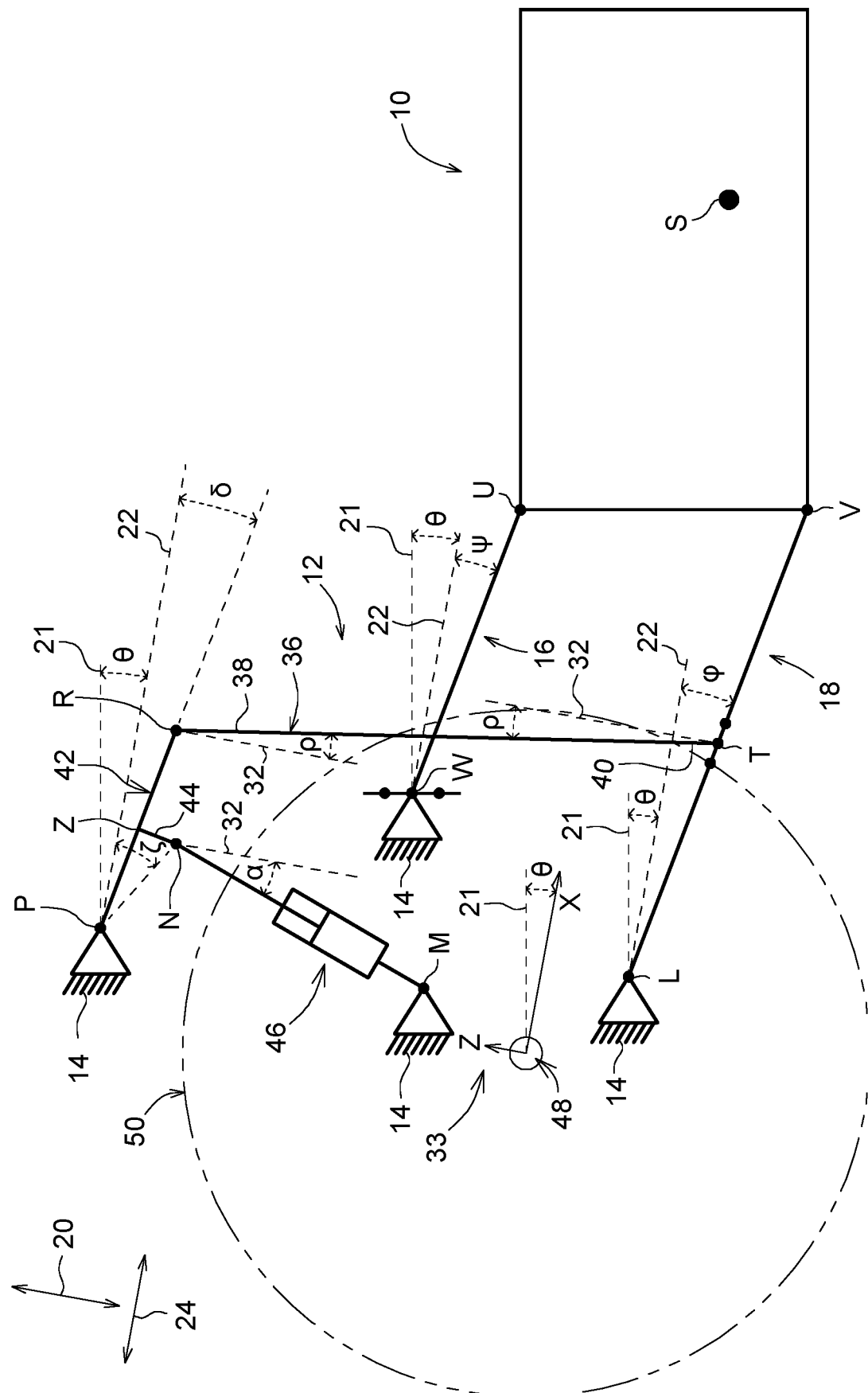
FIG. 1 is a schematic side view of an attached implement articulated to a rear powerlift at the front end of a utility vehicle.

In FIG. 1, an attached implement 10 is schematically shown articulated to the rear end of a utility vehicle (such as a tractor). A powerlift 12, designed as a rear powerlift 12, is articulated onto a support structure 14 of the utility vehicle. The rear powerlift 12 has an upper link 16 and two parallel lower links 18 for receiving the attached implement 10. The upper link 16 has an articulated connection via an articulation point W to the support structure 14 and via an articulation point U to the attached implement 10. In a transverse direction of the utility vehicle, running perpendicular to the plane of FIG. 1, the upper link 16 is arranged centrally between two parallel lower links 18. Each lower link 18 has an articulated connection via an articulation point L to the support structure 14 and via an articulation point V to the attached implement 10. The articulation points U, V on the attached implement 10 are designed in the usual manner, e.g., as catch hooks for the rear powerlift 12.

In the present embodiment, the articulation point W permits three different positions in the vertical direction 20 for articulating the upper link 16. The respective position is defined by a user and appropriately installed. An angle ψ is enclosed between the upper link 16 and a vehicle horizontal line 22. An angle φ is enclosed between each lower link 18 and a vehicle horizontal line 22.

The angles formed between the vehicle horizontal line 22 and a vehicle vertical line 32, particularly angles ψ and φ, relate to a fixed vehicle coordinate system 33 having an x-axis and a z-axis. The x-axis runs parallel to a longitudinal direction 24 of the utility vehicle or parallel to the vehicle horizontal line 22. The z-axis runs parallel to the vertical direction 20 of the utility vehicle or parallel to the vehicle vertical line 32. The inclination of the support structure 14, and thus of the vehicle horizontal line 22 of the utility vehicle, relative to the terrestrial horizontal line 21, is represented by an angle of inclination θ. The angle of inclination θ takes on values greater than zero when the utility vehicle is oriented uphill in the forward direction. The angle of inclination θ analogously assumes values less than zero when the utility vehicle is oriented downhill in the forward direction.

A lifting arm designed in a conventional manner as an adjustable-length lifting spindle 36 (i.e., a spindle-thread unit) is a component of the rear powerlift 12. The lifting spindle 36 has two operative ends 38, 40. One operative end 38 has an articulated connection to an articulation point R of a joint arm 42, whereas the other operative end 40 of the lifting spindle 38 is articulated to a link-connecting point T of the lower link 18. In the present embodiment, the link-connecting point T allows three different positions along the longitudinal direction 24 for articulating the lifting spindle 36 to the lower link 18. The respective position is defined by a user and installed accordingly. A connecting path between the two operative ends 38, 40 of the lifting spindle 36 encloses an angle ρ with the vehicle vertical line 32 running in the vertical direction 20. Both lower links 18 are connected to a lifting spindle 36 in the manner described.

The joint arm 42 has a first articulation point P for an articulated connection to the support structure 14. At the second articulation point R, the joint arm 42 has an articulated connection to the lifting spindle 36. A third articulation point N, which is arranged on an arm 44 of the joint arm 42, is present between the two articulation points P, R. The arm 44 branches off at a branching point Z of the path PR. An additional lifting arm in the form of a lifting cylinder 46 has an articulated connection to the third articulation point N and the support structure 14 at the articulation point M. A lifting spindle 36, a joint arm 42 and a lifting cylinder 46 are provided for each lower link 18.

The connecting path between the articulation points P and R encloses an angle δ with the vehicle horizontal line 22. The connecting path between the articulation points P and N encloses an angle ζ with the vehicle horizontal line 22. The connecting path between the two operative ends of the lifting cylinder 46 encloses an angle α with the vehicle vertical line 32.

For mathematical/geometrical determination of a mass m and a center of gravity S of the rear attached implement 10, a coordinate system 33 is defined, the x-axis of which is oriented parallel to the longitudinal direction 24 and the z-axis of which is oriented parallel to the vertical direction 20. In the present embodiment of FIG. 1, the zero point of this coordinate system 33 lies on a schematically indicated rear axle 48 of the utility vehicle. A rear wheel 50 of the rear axle 48 is also schematically shown.

Figure 2:
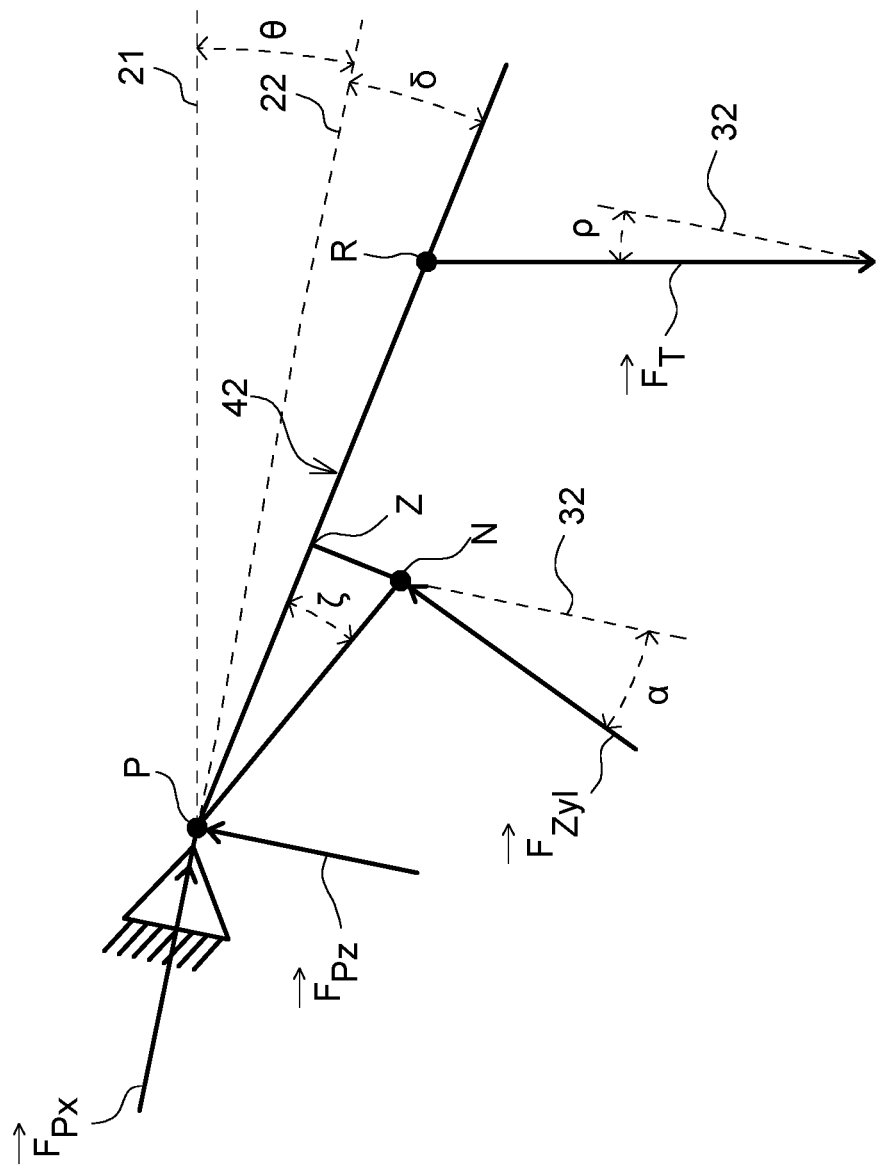
FIG. 2 is a schematic representation of forces impinging on a joint arm of the rear powerlift according to FIG. 1.
Figure 3:
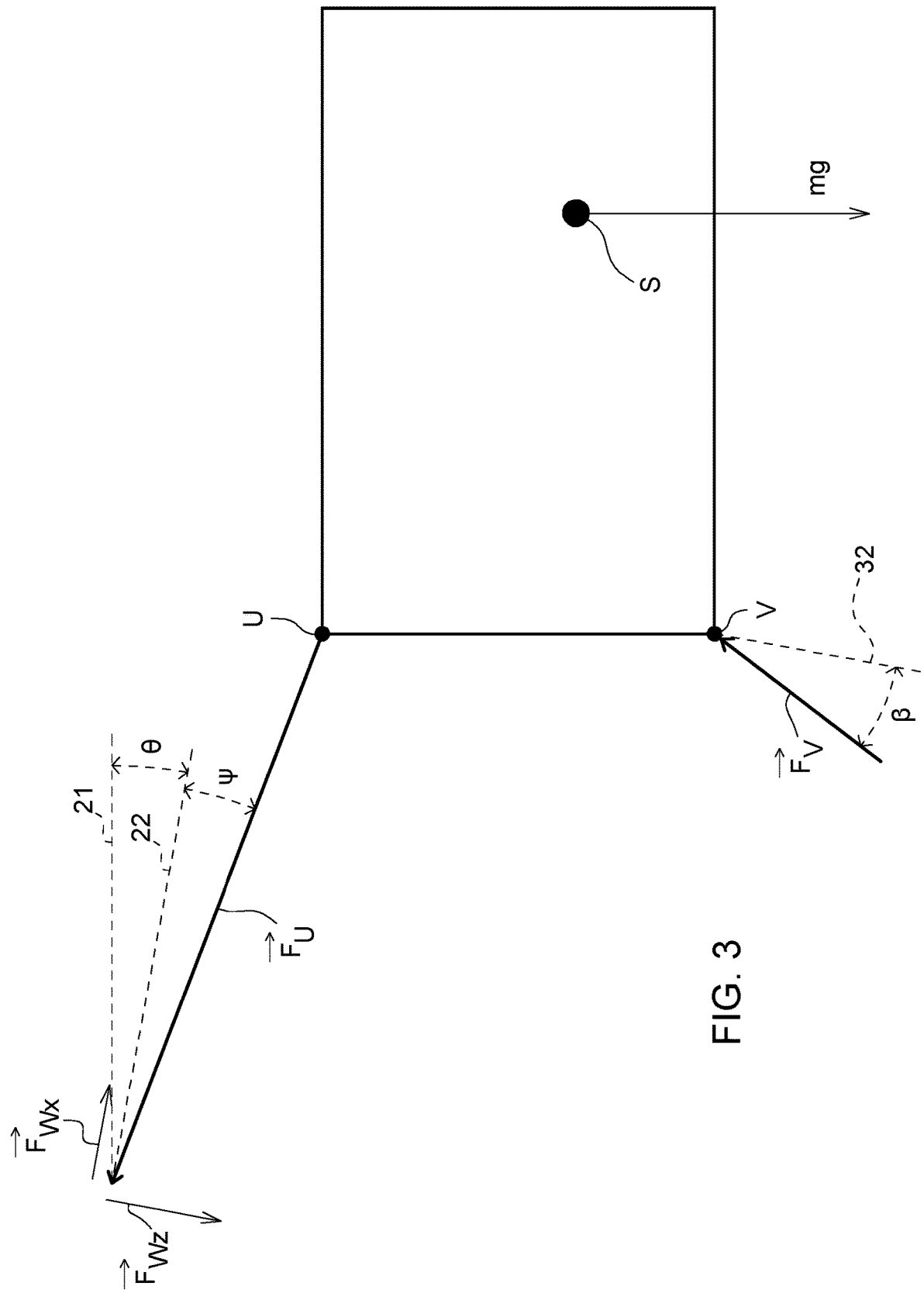
FIG. 3 is a schematic representation of forces impinging on the attached implement from FIG. 1.
Figure 4:
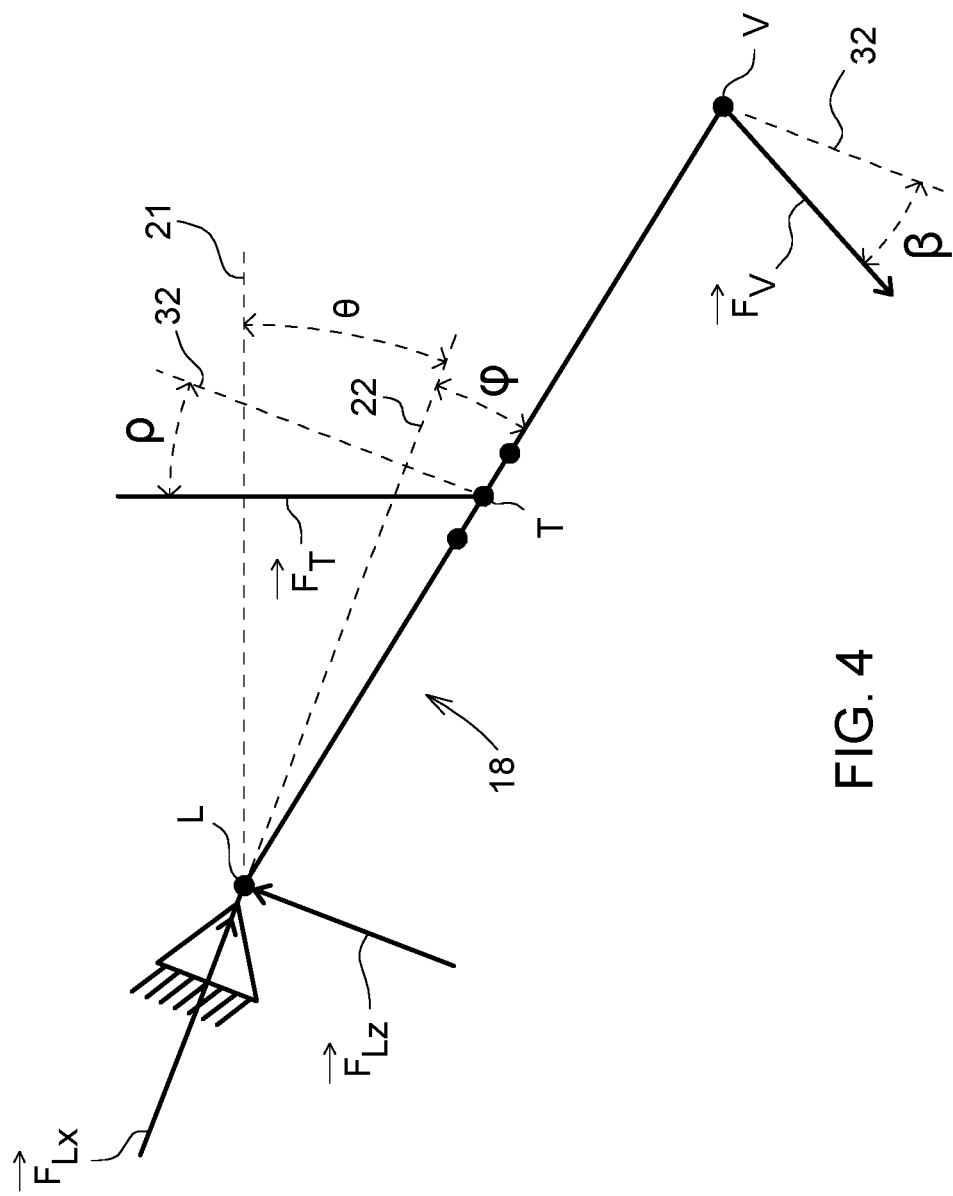
FIG. 4 is a schematic representation of forces impinging on a lower link of the rear powerlift according to FIG. 1.

FIGS. 2-4 present different forces impinging on the force system between support structure 14 and attached implement 10. A force of which the x-component is designated $F_{Px}$ and the z-component is designated $F_{Pz}$ impinges on the articulation point P (FIG. 2). A cylinder force $F_{Zy1}$ is active between the two operative ends of the lifting cylinder 46. A force $F_T$ is active between the articulation point R of the joint arm 42 and the link-connecting point T of the lower link 18. A force $F_V$, which is oriented at an angle β relative to a vehicle vertical line 32, impinges on the articulation point V (FIG. 3). A force impinging on the articulation point U and acting along the upper link 16 is designated $F_U$. The weight force of the attached implement 10 at center of gravity S is marked m·g, where g is the gravitational constant. A force of which the x-component is designated $F_{Lx}$ and the z-component is designated $F_{Lz}$ impinges on the articulation point L (FIG. 4).

Based on the torque and force equilibria in FIG. 2, the following relationships can be assumed at the rear powerlift 12:

$$\Sigma M_i^{(P)} = 0 \rightarrow 0 = -\overline{PR} \cdot \vec{F}_T \cdot \cos(\delta+\rho) + \overline{PN} \cdot \vec{F}_{Zy1} \cdot \cos(\zeta-\alpha) \quad (1)$$

$$\Sigma \vec{F}_{ix} = 0 \rightarrow 0 = \vec{F}_{Px} + \vec{F}_{Zy1} \cdot \sin\alpha + \vec{F}_T \cdot \sin\rho \quad (2)$$

$$\Sigma \vec{F}_{iz} = 0 \rightarrow 0 = \vec{F}_{Pz} + \vec{F}_{Zy1} \cdot \cos\alpha - \vec{F}_T \cdot \cos\rho \quad (3)$$

It also follows from equation (1) that $$\vec{F}_T = \vec{F}_{Zy1} \cdot \frac{\overline{PN}}{\overline{PR}} \cdot \frac{\cos(\zeta-\alpha)}{\cos(\delta+\rho)} \quad (4)$$

Due to the torque and force equilibria in FIG. 3, the following additional relationships at the rear powerlift 12 can be assumed:

$$\Sigma M_i^{(V)} = 0 \rightarrow 0 = (U_x - V_x) \cdot \vec{F}_U \cdot \sin\psi + (U_z - V_z) \cdot \vec{F}_U \cdot \cos\psi - (S_x - V_x) \cdot m \cdot g \cdot \cos\theta - (S_z - V_z) \cdot m \cdot g \cdot \sin\theta \quad (5)$$

$$\Sigma \vec{F}_{ix} = 0 \rightarrow 0 = \vec{F}_V \sin\beta - \vec{F}_U \cos\psi + m \cdot g \cdot \sin\theta \rightarrow \vec{F}_V \sin\beta = \vec{F}_U \cos\psi - m \cdot g \cdot \sin\theta \quad (6)$$

$$\Sigma \vec{F}_{iz} = 0 \rightarrow 0 = \vec{F}_V \cos\beta - \vec{F}_U \sin\psi + m \cdot g \cdot \cos\theta \rightarrow \vec{F}_V \cos\beta = \vec{F}_U \sin\psi - m \cdot g \cdot \cos\theta \quad (7)$$

Due to the torque and force equilibria in FIG. 4, the following additional relationships at the rear powerlift can be assumed:

$$\Sigma M_i^{(L)} = 0 \rightarrow 0 = -\overline{LT} \cdot \vec{F}_T \sin\rho \cdot \sin\varphi + \overline{LT} \cdot \vec{F}_T \cos\rho \cdot \cos\varphi - \overline{LV} \cdot \vec{F}_V \sin\varphi \cdot \sin\beta - \overline{LV} \cdot \vec{F}_V \cos\varphi \cdot \cos\beta \quad (8)$$

$$\Sigma \vec{F}_{ix} = 0 \rightarrow 0 = \vec{F}_V \sin\beta - \vec{F}_T \sin\rho + \vec{F}_{Lx} \quad (9)$$

$$\Sigma \vec{F}_{iz} = 0 \rightarrow 0 = \vec{F}_V \cos\beta - \vec{F}_T \cos\rho + \vec{F}_{Lz} \quad (10)$$

By inserting equations (6) and (7) into equation (8), and by solving equation (8) for the mass m of the attached implement 10, it follows that for the mass m $$m = \frac{\overline{LT} \cdot \vec{F}_T \cdot \cos(\varphi+\rho) - \overline{LV} \cdot \vec{F}_U \cdot \sin(\varphi-\psi)}{\overline{LV} \cdot g \cdot \cos(\varphi+\theta)} \quad (11)$$

Thus, the mass m is determined as a function of
- the angle ψ between the upper link 16 and the vehicle horizontal line 22,
- the angle φ between the lower link 18 and the vehicle horizontal line 22,
- the angle ρ between the lifting spindle 36 and the vehicle vertical line 32,
- the angle of inclination θ of the support structure 14 or the vehicle horizontal line 22 of the utility vehicle in relation to the terrestrial horizontal line 21,
- the path LV along the lower link 18 as the connection between the articulation points L and V,
- the path LT along the lower link 18 between the articulation point L and the link-connecting point T,
- the force $F_T$ on the lifting spindle 36, and
- the force $F_U$ along the upper link 16.

The length of the path LV is a known design parameter of the rear powerlift 12. The length of the path LT can be measured by means of a length sensor or a distance sensor, for example, or the length of this path LT is known based on the user-dependent installation of the lifting spindle 36 on the lower link 18. The force $F_U$ can be measured by means of pressure sensors on the upper link 16 or can alternatively by measured means of a biaxial force sensor at the articulation point W. The force $F_T$ can be indirectly determined by measuring the force $F_{Zy1}$ at the lifting cylinder 46 and can be taken into account in equation (4). The paths PN and PR of the joint arm 42 in equation (4) are constant and to that extent are known design parameters.

The angle δ in equation (4) can be measured by means of a suitable sensor (e.g. an angle sensor). From this, the value of angle ζ can be easily derived:

$$\zeta = \tan^{-1}\left(\frac{P_z - N_z}{P_x - N_x}\right)$$

The articulation point P has fixed x-and z-coordinates $P_x$ and $P_z$ relative to the coordinate system 33. The x-coordinate $N_x$ and the z-coordinate $N_x$ of the articulation point N follow from $$N_x = P_x + \overline{PZ} \cdot \cos\delta + \overline{ZN} \cdot \sin\delta \text{ and } N_z = P_z - \overline{PZ} \cdot \sin\delta - \overline{ZN} \cdot \cos\delta,$$

where the angle δ, as already mentioned, is measured and the paths PZ, ZN are constant design parameters of the joint arm 42.

The angle α in equation (4) is determined as follows:

$$\alpha = \tan^{-1}\left(\frac{N_x - M_x}{N_z - M_z}\right)$$

The x-coordinate $N_x$ and the z-coordinate $N_z$ of the articulation point N are derived as just explained, while the articulation point M has fixed x- and z-coordinates $M_x$ and $M_z$ relative to the coordinate system 33.

The angles ρ, φ and ψ in equations (4) and (11) can be derived as follows:

$$\varphi = \tan^{-1}\left(\frac{L_z - T_z}{L_x - T_x}\right)$$

$$\psi = \tan^{-1}\left(\frac{U_z - W_z}{U_x - W_x}\right) = \tan^{-1}\left(\frac{F_{W_z}}{F_{W_x}}\right)$$

$$\rho = \tan^{-1}\left(\frac{T_x - R_x}{T_z - R_z}\right)$$

The x-coordinate $L_x$ and the z-coordinate $L_z$ are known since the articulation point L thereof on the support structure 14 has fixed coordinates relative to the coordinate system 33. The x-coordinate $W_x$ and the z-coordinate $W_z$ of the articulation point W are also known, depending on the application case, and are therefore either determined by sensors or specified by the operator.

The above-mentioned angles can also be measured by means of suitable angle sensors. Alternatively, biaxial force measuring pins can be used, as illustrated with reference to angle ψ and the two force components $F_{W_x}$ (along the x-axis of the coordinate system 33) and $F_{W_z}$ (along the z-axis of the coordinate system 33) in schematic form (FIG. 2).

The variable x-coordinate $R_x$ and z-coordinate $R_z$ of the articulation point R of the joint arm 42 are preferably derived as follows:

$$R_x = P_x + \overline{PR} \cdot \cos\delta \text{ and } R_z = P_z - \overline{PR} \cdot \sin\delta$$

The articulation point P has fixed coordinates $P_x$ and $P_z$ relative to the coordinate system 33. The path PR is a fixed design parameter of the joint arm 42.

The variable x-coordinates and z-coordinates $T_x$ and $T_z$ of the link-connecting point T and $U_x$ and $U_z$ of the articulation point U can be derived mathematically as follows:

To calculate the link-connecting point T, two circles are defined. The first circle has a radius corresponding to the path LT with a circle center L and the second circle has a radius corresponding to the path RT with a circle center R. The associated circle equations are $$(T_x - L_x)^2 + (T_z - L_z)^2 = \overline{LT}^2 \quad (T_x - R_x)^2 + (T_z - R_z)^2 = \overline{TR}^2$$

The two circle equations are solved for the z-component of the link-connecting point T. This yields a straight-line equation of a straight line running through the two circle centers, of the form $$T_z = -\underbrace{\left(\frac{R_x - L_x}{R_z - L_z}\right)}_{n} \cdot T_x + \underbrace{\left(\frac{\overline{CT}^2 - \overline{TR}^2 + R_x^2 + R_z^2 - L_x^2 - L_z^2}{2 \cdot (R_z - L_z)}\right)}_{b}$$

$$T_x = -n \cdot T_x + b$$

With respect to the link-connecting point T, the quadratic equation that follows by inserting the straight-line equation into one of the two circle equations $$T_x^2 + \underbrace{\frac{2 \cdot (-R_x - n \cdot w)}{1 + n^2}}_{p_1} \cdot T_x + \underbrace{\frac{R_x^2 + w^2 - \overline{TR}^2}{1 + n^2}}_{q_1} = 0$$

and the auxiliary variables n, b and w $$n = \left(\frac{R_x - L_x}{R_z - L_z}\right)$$

-continued $$b = \left(\frac{\overline{LT}^2 - \overline{TR}^2 + R_x^2 + R_z^2 - L_x^2 - L_z^2}{2 \cdot (R_z - L_z)}\right)$$

$$w = b - R_z$$

are defined. This yields the following equations for the x-coordinate $T_x$ and the z-coordinate $T_z$:

$$T_x = -\frac{p_1}{2} + \sqrt{\frac{p_1^2}{4} - q_1} = \qquad (12)$$

$$\frac{(R_x + n \cdot w)}{1 + n^2} + \sqrt{\left(\frac{(R_x + n \cdot w)}{1 + n^2}\right)^2 - \frac{R_x^2 + w^2 - \overline{TR}^2}{1 + n^2}}$$

$$T_z = -n \cdot T_x + b \qquad (13)$$

The path TR can be measured by means of a length sensor, for example, or a distance sensor on the lifting spindle 36. Alternatively, the length of this path TR is known based on a specification by the user for the respective setting of the rear powerlift 12.

Two additional circles are defined for calculating the articulation point U. The first circle has a radius corresponding to the path UV with circle center V and the second circle has a radius corresponding to the path WU with circle center W. The associated circle equations are $$(U_x - V_x)^2 + (U_z - V_z)^2 = \overline{UV}^2 \quad (U_x - W_x)^2 + (U_z - W_z)^2 = \overline{WU}^2$$

The two circle equations are solved for the z component of the articulation point U. This yields a straight-line equation of a straight line running through the two circle centers of the form $$U_z = -u \cdot U_x + s$$

$$U_z = -\underbrace{\left(\frac{W_x - V_x}{W_z - V_z}\right)}_{u} \cdot U_x + \underbrace{\left(\frac{\overline{UI}^2 - \overline{WU}^2 + W_x^2 + W_z^2 - V_x^2 - V_z^2}{2 \cdot (W_z - V_z)}\right)}_{s}$$

With respect to the articulation point U, the quadratic equation that follows by inserting the straight-line equation into one of the two circle equations $$U_x^2 + \underbrace{\frac{2 \cdot (-W_x - u \cdot z)}{1 + u^2}}_{p_2} \cdot U_x + \underbrace{\frac{W_z^2 + z^2 - \overline{WU}^2}{1 + u^2}}_{q_2} = 0$$

as well as the auxiliary variables u, s and z $$u = \left(\frac{W_x - V_x}{W_z - V_z}\right)$$

$$s = \left(\frac{\overline{UV}^2 - \overline{WU}^2 + W_x^2 + W_z^2 - V_x^2 - V_z^2}{2 \cdot (W_z - V_z)}\right)$$

$$z = s - W_z$$

are defined. This yields the following equations for the x-coordinate $U_x$ and the z-coordinate $U_z$:

$$U_x = -\frac{p_2}{2} + \sqrt{\frac{p_2^2}{4} - q_2} = \qquad (14)$$

$$\frac{(W_x + u \cdot z)}{1 + u^2} + \sqrt{\left(\frac{(W_x + u \cdot z)}{1 + u^2}\right)^2 - \frac{W_x^2 + z^2 - \overline{WU}^2}{1 + u^2}}$$

$$U_z = -u \cdot U_x + s \qquad (15)$$

The path WU can be measured by means of a length sensor or a distance sensor on the upper link 16, for example. The path UV is a defined value corresponding to the dimensioning of the attached implement 10.

The x-coordinate $S_x$ of the center of gravity S of the attached implement 10 relative to the coordinate system 33 can be determined by solving equation (5) for $S_x$. In this case, the angle of inclination θ is assumed to be 0°:

$$S_x = \frac{1}{m \cdot g}\left[(U_x - V_x) \cdot \vec{F}_U \cdot \sin\psi + (U_z - V_z) \cdot \vec{F}_U \cdot \cos\psi + V_x \cdot m \cdot g\right] \qquad (16)$$

Thus the x-coordinate of the center of gravity S is determined as a function of
the determined mass m,
the angle ψ between the upper link 16 and the vehicle horizontal line 22,
the force $F_U$ on the upper link 16,
the x-coordinate $V_x$ of the articulation point V of the lower link 18 at the attached implement 10,
the difference between the x-coordinates $U_x$ and $V_x$ of the articulation points U and V at the attached implement 10, and
the difference between the z-coordinates $U_z$ and $V_z$ of the articulation points U and V at the attached implement 10.

The x-coordinate $V_x$ and the z-coordinate $V_z$ of the articulation point V follow from, for example $$V_x = L_x + \overline{LV} \cdot \cos\varphi \text{ and } V_z = L_z - \overline{LV} \cdot \sin\varphi,$$

wherein the path LV is a known design parameter and the articulation point L has fixed x- and z-coordinates $L_x$ and $L_z$ relative to the coordinate system 33. The other components and values of equation (16) can be derived according to the above description.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:
1. A method for determining a mass of an implement of a utility vehicle, comprising:
providing a rear powerlift having at least one upper link and at least one lower link, a support structure disposed at the rear of the utility vehicle, an adjustable-length lifting arm wherein a first operative end of the lifting arm comprises an articulated connection to the support structure and a second operative end of the lifting arm comprises an articulated connection to a link-connect- ing point of the lower link, and the implement being articulatably coupled to the support structure;

defining an angle ($\psi$) between the upper link and a vehicle horizontal line, an angle ($\varphi$) between the lower link and the vehicle horizontal line, an angle ($\rho$) that is enclosed by a vehicle-vertical line and a connecting path (RT) between the two operative ends of the lifting arm, an angle of inclination ($\theta$) of a vehicle horizontal line relative to a terrestrial horizontal line, a path (LV) representative of a connection along the lower link between the support structure and the implement, a path (LT) defined by a connection along the lower link between the support structure and the link-connecting point of the lower link, a force ($F_T$) acting between the two operative ends of the lifting arm, and a force ($F_U$) impinging on a connection between the upper link and the implement and acting along the upper link; and determining the mass of the implement as a function of at least the angle ($\psi$), the angle ($\varphi$), the angle ($\rho$), the angle of inclination ($\theta$), the path (LV), the path (LT), the force ($F_T$), and the force ($F_U$) according to the equation:

$$m = \frac{\overline{LT} \cdot \vec{F}_T \cdot \cos(\varphi + \rho) - \overline{LV} \cdot \vec{F}_U \cdot \sin(\varphi - \psi)}{\overline{LV} \cdot g \cdot \cos(\varphi + \theta)}.$$

2. The method of claim 1, wherein the first operative end comprises an articulated connection via a joint arm to the support structure.

3. The method of claim 2, wherein the joint arm comprises:
    a first articulation point associated with the support structure and a second articulation point associated with the lifting arm; and
    a third articulation point between the first and second articulation points.

4. The method of claim 3, further comprising providing another adjustable-length lifting arm comprising an articulated connection to the third articulation point and the support structure.

5. The method of claim 4, further comprising determining an x-coordinate of the center of gravity of the attached implement as a function of the mass of the attached implement.

6. The method of claim 5, wherein the determining the x-coordinate of the center of gravity step is determined as a function of:
    the angle ($\psi$) between the upper link and a vehicle horizontal line;
    the force ($F_U$) impinging on a connection between the upper link and the attached implement and acting along the upper link;
    an x-coordinate of an articulation point of the lower link on the attached implement;
    a difference between the x-coordinates of an articulation point of the upper link on the attached implement and an articulation point of the lower link on the attached implement; and
    a difference between the z-coordinates of an articulation point of the upper link on the attached implement and an articulation point of the lower link on the attached implement.

7. The method of claim 1, further comprising providing a lifting arm including a piston-cylinder unit.

8. The method of claim 1, wherein the lift arm comprises a spindle-thread unit.

9. The method of claim 1, further comprising determining a center of gravity of the attached implement as a function of the determined mass of the attached implement.

10. The method of claim 1, further comprising:
    defining a coordinate system having an x-axis oriented parallel to a longitudinal direction of the utility vehicle and a z-axis oriented parallel to a vertical direction of the utility vehicle, wherein the x-axis and the z-axis intersect in a zero point of the coordinate system; and
    determining the mass or a center of gravity of the attached implement based on the coordinate system.

11. The method of claim 10, further comprising arranging a zero point on a rear axle of the utility vehicle.

* * * * *